US008423881B2

(12) United States Patent
Girgensohn et al.

(10) Patent No.: US 8,423,881 B2
(45) Date of Patent: Apr. 16, 2013

(54) SYSTEMS AND METHODS FOR PLACING VISUAL LINKS TO DIGITAL MEDIA ON PHYSICAL MEDIA

(75) Inventors: Andreas Girgensohn, Palo Alto, CA (US); Chunyuan Liao, San Jose, CA (US); Qiong Liu, Milpitas, CA (US); Lynn Donelle Wilcox, Palo Alto, CA (US); Frank M. Shipman, III, College Station, TX (US)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 13/204,235

(22) Filed: Aug. 5, 2011

(65) Prior Publication Data
US 2013/0036345 A1 Feb. 7, 2013

(51) Int. Cl.
G06F 17/00 (2006.01)
G06F 17/20 (2006.01)
G06F 17/21 (2006.01)
G06F 17/22 (2006.01)

(52) U.S. Cl.
USPC .......................... 715/205; 715/243; 715/244

(58) Field of Classification Search .................. 715/205, 715/243, 244
See application file for complete search history.

(56) References Cited

U.S. PATENT DOCUMENTS

| | | | |
|---|---|---|---|
| 6,711,293 B1 | 3/2004 | Lowe | |
| 2010/0080469 A1 | 4/2010 | Liu et al. | |
| 2010/0259537 A1* | 10/2010 | Ben-Himane et al. | 345/419 |
| 2011/0072037 A1* | 3/2011 | Lotzer | 707/769 |
| 2011/0154174 A1* | 6/2011 | Liu et al. | 715/205 |
| 2011/0239296 A1* | 9/2011 | Schipper | 726/22 |
| 2012/0037695 A1* | 2/2012 | Liu et al. | 235/375 |
| 2012/0177002 A1* | 7/2012 | Faucher et al. | 370/331 |
| 2012/0239647 A1* | 9/2012 | Savenok et al. | 707/736 |
| 2012/0269439 A1* | 10/2012 | Yang et al. | 382/190 |

OTHER PUBLICATIONS

Liu et al. "Embedded Media Markers: Marks on Paper that Signify Associated Media". Copyright Date: Apr. 9, 2009.*
Liu et al. "Embedded Media Barcode Links: Optimally Blended Marcode Overlay on Paper for Linking to Associated Media". Copyright Date: 2010.*
Li et al. "Ways to Integrate Digital and Physical Media by Using Middleware." <no Copyright Date>.*
Yang et al."Large Scale EMM Idetification Based on Geometry—Constrained Visual Word Corresponding Voting." Copyright Date: Apr. 20, 2011.*

(Continued)

*Primary Examiner* — Doug Hutton, Jr.
*Assistant Examiner* — Soumya Dasgupta
(74) *Attorney, Agent, or Firm* — Sughrue Mion, PLLC

(57) ABSTRACT

Systems and methods provide for determining a location and size of a visual link to digital media on physical media such as a paper document. An authoring tool for creating a link on a paper document, such as an Embedded Media Marker (EMM), identifies and scores other EMMs and related keypoints on the document to determine similarities between a newly-created EMM and other EMMs and keypoints on the paper document. The scores are visualized for a user on a display in order to position and size the newly-created EMM in a location on the paper document that will avoid confusion with other EMMs and related content. The location and size of the newly-created EMM may be automatically adjusted based on the scoring of the keypoints and related EMMs.

21 Claims, 15 Drawing Sheets

OTHER PUBLICATIONS

Yang et al. "Minimum Correspondence Sets for Improving Large-Scale Augmented Paper." Copyright Date: 2011.*

Girgensohn et al. "A Tool for Authoring Unambiguous Links from Printed Content to Digital Media". Copyright Date: 2011.*

Sunil Arya, et al., "An Optimal Algorithm for Approximate Nearest Neighbor Searching in Fixed Dimensions," The Proceedings of the Fifth Annual ACM-SIAM Symposium on Discrete Algorithms, 1994, pp. 573-582.

Qiong Liu, et al., "High Accuracy and Language Independent Document Retrieval With a Fast Invariant Transform," IEEE International Conference on Multimedia and Expo (ICME), 2009, 4 pages total.

David G. Lowe, "Distinctive Image Features from Scale-Invariant Keypoints," International Journal of Computer Vision, Jan. 5, 2004, pp. 1-28.

Xu Wangming, et al., "Application of Image SIFT Features to the Context of CBIR," 2008 International Conference on Computer Science and Software Engineering, 2008, pp. 552-555.

* cited by examiner

SYSTEMS AND METHODS FOR PLACING VISUAL LINKS TO DIGITAL MEDIA ON PHYSICAL MEDIA

BACKGROUND

1. Field of the Invention

This invention relates to systems and methods for determining a location of a visual link to digital media on physical documents, and more particularly to calculating and adjusting a size and location of a visual digital media link based on the location of other digital media links and the similarities between portions of content on the media.

2. Description of the Related Art

There are many systems that provide links to digital media from physical media—such as a paper document—using visual content analysis and indicators. Typically, a user takes a picture of the document that includes a visual link using a cell phone or other portable device with a camera, and the image is processed either on the phone or a remote server to identify and then access the linked media. The linked media is then displayed on the phone.

One example of a visual link is an Embedded Media Marker (EMM) 100, illustrated in FIG. 1A. An EMM 100 differs from other content-based retrieval methods by placing a faint mark on a paper document indicating a specific region of the page to be captured without interfering with the readability of the page content. The EMM 100 may be represented by a boundary 102, icon 104 and a pointer 106. FIG. 1B illustrates an EMM 100 as it would appear on a paper document 104. The use and functions of EMMs are described in co-pending US Application No. 12/646,841, filed December 23, 2009 and incorporated herein by reference in its entirety. The EMMs not only indicate to the user that there is media associated with a part of the document, but also allows the user to zoom in with the camera to avoid capturing the rest of the page. By only indexing page regions, this approach reduces the size of the index for the document and provides a means to control retrieval accuracy by assuring the marked region on the page can be easily recognized.

The existing EMM system includes an authoring tool for placing an EMM on a document page that allows the user to interactively select a region of the page that is meaningful for EMM placement, and that has a number of keypoints for recognition. A keypoint is a feature vector describing the local image characteristics near a location in an image. As the user moves the EMM to desired locations, the capture region is dynamically increased or decreased based on the number of document keypoints. If there are insufficient keypoints, the EMM signified region of the page is shaded red. Although this prevents the user from placing an EMM in a region with too few keypoints, it does not guarantee recognition accuracy, since the keypoints might be similar or identical to other EMMs in the database.

While the current authoring tool in the EMM system checks if there are enough keypoints in a candidate region for an EMM, it does not check if those keypoints would conflict with previously authored EMMs or if the keypoints could be easily confused with content on other pages in a collection.

SUMMARY

Systems and methods described herein provide for determining a location and size of a visual link to digital media on physical media, and more specifically to an authoring tool for creating Embedded Media Markers (EMMs) on one or more pages of a physical document, identifying and scoring similarities between the newly-created EMM and other EMMs and keypoints on the physical document, and providing a visualization of the scores to a user who is creating the EMMs so that a newly-created EMM can be positioned and sized on the physical document to avoid confusion with other EMMs and related content.

In one embodiment of the invention, a method for placing a visual link to digital media on a document comprises displaying at least one page of a document on a display; identifying and matching keypoints of the document with existing visual links and corresponding keypoints using a computer with a processor and a memory; scoring keypoints based on similarities between the keypoints of the document and keypoints of the existing links; receiving a user input selecting one or more regions of the document for placement of the visual link; and placing the visual link on the document.

The score of each keypoint may be modified based on scores of surrounding keypoints.

A visual overlay may be generated on the document based on the keypoint scores, wherein the visual overlay provides a visual indication of the suitability of one or more regions of the document for placement of the visual link.

The size and location of the visual link may be adjusted based on the keypoint scores.

The keypoints adjacent to a keypoint which all match an existing visual link may be penalized.

The modification of the score of each keypoint may be further modified by a weighted scale corresponding to a distance between the keypoints.

The suitability of a region of the document for placement of the visual link may be determined based on a keypoint score density.

The visual overlay may display gradients of shading to indicate whether one or more regions are suitable for placement of the visual link.

The suitability of a region of a document may be increased where a plurality of keypoints within a set radius match a visual link.

The visual links may be embedded media markers (EMMs).

In another embodiment of the invention, a system for placing a visual link to digital media on a document, comprises a display unit which displays at least one page of a document; a matching unit which identifies and matches keypoints of the document with existing visual links and corresponding keypoints; a scoring unit which scores keypoints based on similarities between the keypoints of the document and keypoints of the existing links; an input unit which receives a user input selecting one or more regions of the document for placement of the visual link; and a placement unit which places the visual link on the document.

A score modifying unit may modify the score of each keypoint based on scores of surrounding keypoints.

A visualization unit may generate a visual overlay on the document based on the keypoint scores, wherein the visual overlay provides a visual indication of the suitability of one or more regions of the document for placement of the visual link.

The size and location of the visual link may be adjusted based on the keypoint scores.

The keypoints adjacent to a keypoint which all match an existing visual link may be penalized.

The modification of the score of each keypoint may be further modified by a weighted scale corresponding to a distance between the keypoints.

The suitability of a region of the document for placement of the visual link may be determined based on a keypoint score density.

The visual overlay may display gradients of shading to indicate whether one or more regions are suitable for placement of the visual link.

The suitability of a region of a document may be increased where a plurality of keypoints within a set radius match a visual link.

The visual links may be embedded media markers (EMMs).

In yet another embodiment of the invention, a computer program product for placing a visual link to digital media on a document may be embodied on a computer-readable medium and when executed by a computer, performs the method comprising displaying at least one page of a document on a display; identifying and matching keypoints of the document with existing visual links and corresponding keypoints using a computer with a processor and a memory; scoring keypoints based on similarities between the keypoints of the document and keypoints of the existing links; modifying the score of each keypoint based on scores of surrounding keypoints; generating a visual overlay on the document based on the modified keypoint scores, wherein the visual overlay provides a visual indication of the suitability of one or more regions of the document for placement of the visual link; receiving a user input selecting one or more regions of the document for placement of the visual link; and placing the visual link on the document.

Additional aspects related to the invention will be set forth in part in the description which follows, and in part will be apparent from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification, exemplify the embodiments of the present invention and, together with the description, serve to explain and illustrate principles of the invention. Specifically.

DETAILED DESCRIPTION

In the following detailed description, reference will be made to the accompanying drawings. The aforementioned accompanying drawings show by way of illustration and not by way of limitation, specific embodiments and implementations consistent with principles of the present invention.

Systems and methods provide for determining a location and size of a visual link to digital media on physical media such as a paper document. An authoring tool for creating a link on a document, such as an Embedded Media Marker (EMM), identifies and scores other EMMs and related keypoints on the document to determine similarities between a newly-created EMM and other EMMs and keypoints on the paper document. The scores are visualized for a user on a display in order to position and size the newly-created EMM in a location on the paper document that will avoid confusion with other EMMs and related content. The location and size of the newly-created EMM may be automatically adjusted based on the scoring of the keypoints and related EMMs. The system for authoring EMMs on a collection of document pages allows each of the EMMs to be accurately identified.

The EMM system places a mark on the paper document indicating a specific region of the page with a link to media. Described herein is a system for authoring EMMs on a collection of document pages such that each of the EMMs can be accurately identified when captured by a user using a portable device. For each keypoint in a candidate page region, approximate neighbors are located. Keypoints with close neighbors are assigned negative scores that are spread in the vicinities of those keypoints. A visualization technique indicates page regions with predominantly negative scores so that the author can avoid them. The system also automatically resizes and moves EMMs being authored to avoid such regions.

The embodiments described herein also introduce an EMM authoring tool that takes into consideration possible matches of regions on a page both against previously authored EMMs and against all other pages in a collection. Close matches indicate potential for confusion in later retrieval attempts. Thus, the authoring tool steers the user away from problematic regions on a page and towards regions that have a large number of unique keypoints.

I. Overview

Figure 2:
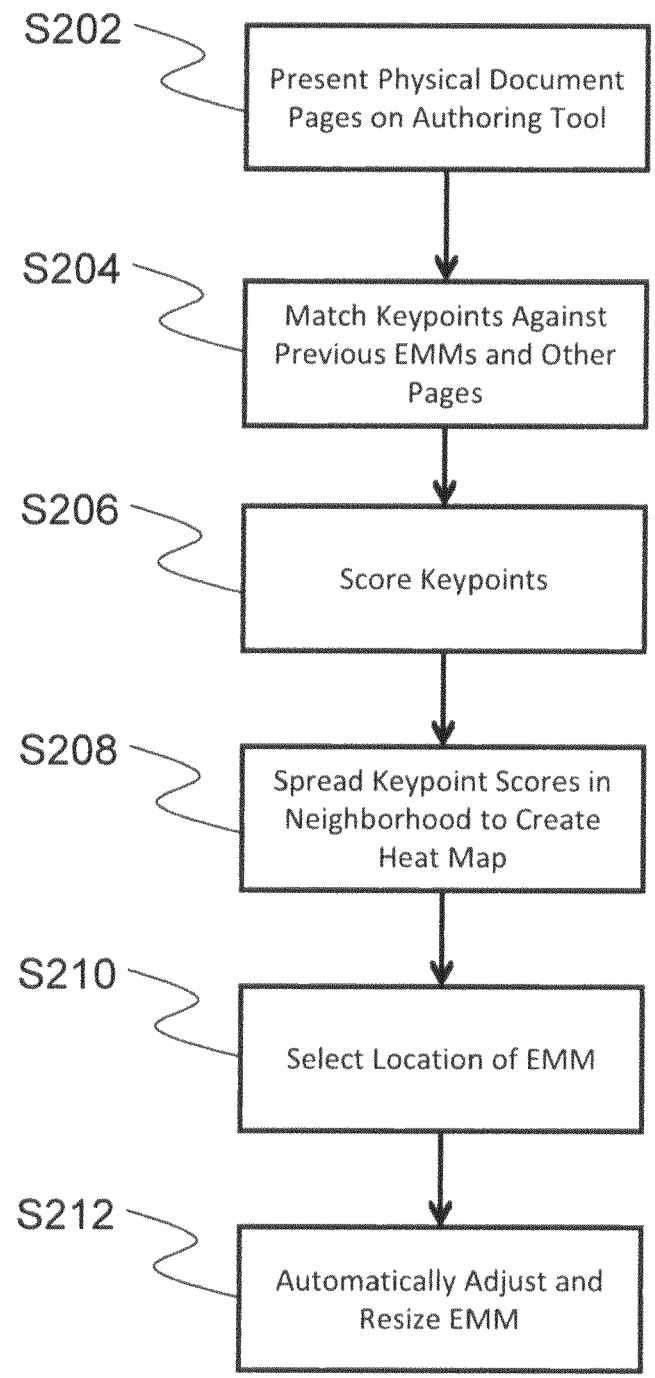
FIG. 2 illustrates a flow chart of a method for placing the EMM on the physical document, according to one embodiment of the invention.

An overview of a method for placing an EMM on the physical document will now be described and is correspondingly illustrated in FIG. 2. First, in step S202, the one or more pages of a physical document are presented to the user on a graphical user interface (GUI) of the authoring tool (see FIG. 4). In step S204, keypoints from the pages or pages are matched both against previously authored EMMs and against the remaining document pages. In step S206, each keypoint is given a score based on how well it matches keypoints of other EMMs or document pages. For each keypoint, its approximate nearest neighbor among keypoints in other EMMs or pages is identified. If this distance is zero, the keypoint is given a score of negative one, indicating that it does not provide good discrimination. As the distance to the neighbor increases, the score increases to a maximum of positive one. In step S208, keypoint scores are then spread in a neighborhood of the document around the keypoint, resulting in a heat map (see FIG. 8) representing the suitability of each region for EMM placement. The user may then select a location to place the EMM in step S210, after which the system may automatically make minor adjustments to the location and size of the EMM in step S212 based on the keypoint scores.

Figure 3:
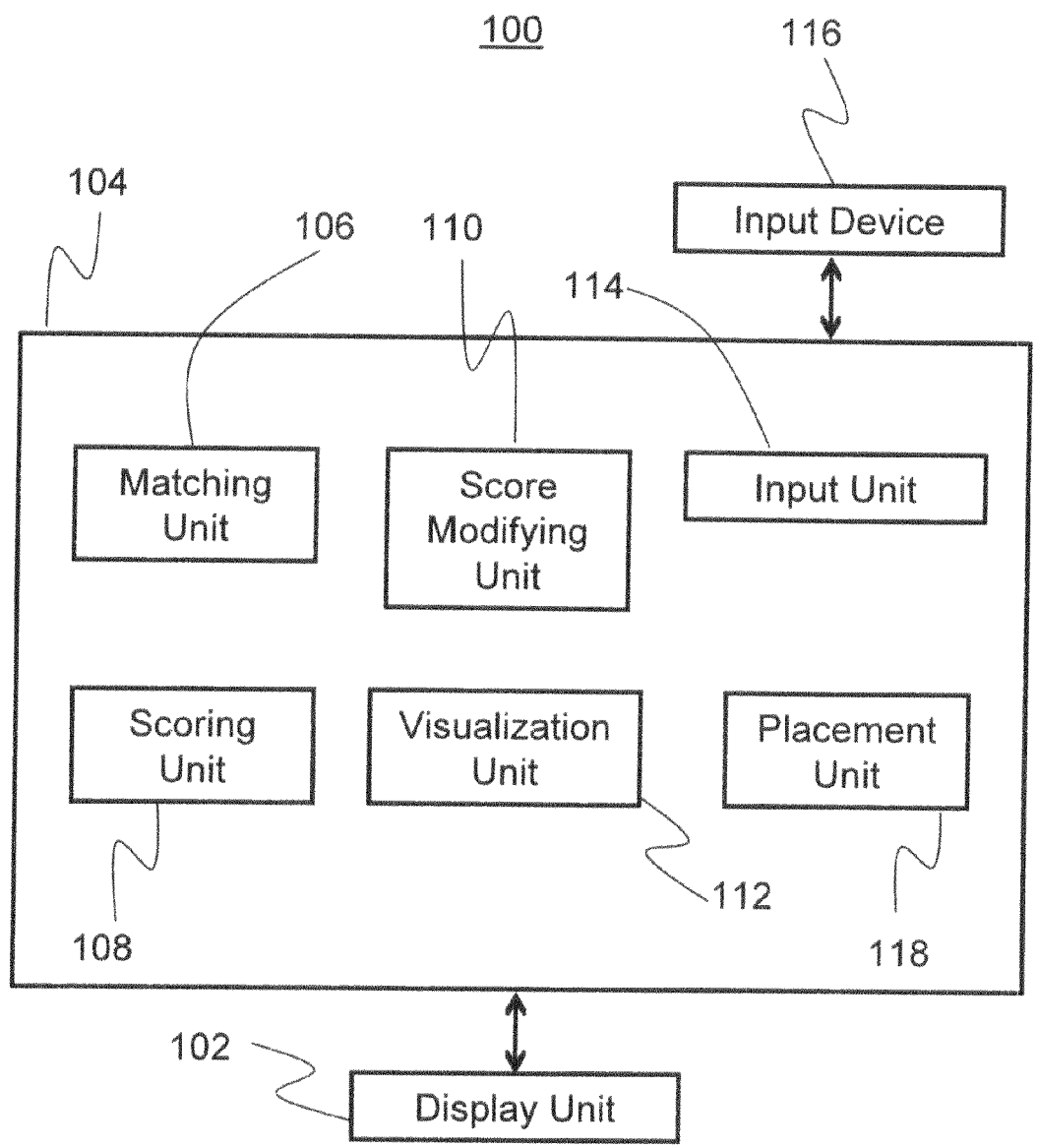
FIG. 3 is a block diagram of a system for placing a newly-created EMM on physical media, according to one embodiment of the invention.

FIG. 3 illustrates a corresponding system 100 for placing a visual link to digital media on a document. In one embodiment, a display unit 102 may communicate with a computer 104 which houses the various units described below. The various components of the computer 104 are described further below (see FIG. 16). The display unit 102 displays a graphical user interface (GUI) which displays at least one page of a document. A matching unit 106 identifies and matches keypoints of the document with existing visual links, after which a scoring unit 108 scores keypoints based on similarities between the keypoints of the document and keypoints of the existing links. A score modifying unit 110 spreads the score of each keypoint to an area surrounding each respective keypoint. A visualization unit 112 generates a visual overlay on the document based on the spread keypoint scores. As will be described further below, the visual overlay provides a visual indication of the suitability of one or more regions of the document for placement of the visual link. An input unit 114 receives a user input (for example from a user input device 116 such as a mouse or keyboard) selecting one or more regions of the document for placement of the visual link; and a placement unit 118 places the visual link on the document.

Different approaches for keypoint detection and description of their features can be used, such as that described in U.S. application Ser. No. 12/646,841, filed Dec. 23, 2009 and incorporated herein by reference in its entirety. Similarly, different database representations for locating nearby keypoints can be used. An approximate nearest neighbor (ANN) tree would work well for this purpose. The only requirement is that keypoints can be detected in an image, that nearby keypoints can be found in a database, and that the found keypoints include distances to the image keypoints and associations to previously authored EMMs.

II. Collections of Document Pages

An authored collection of EMMs comes from a corresponding collection of document pages. Such a collection may consist of the pages of a single book or issue of a magazine. A collection may also encompass the pages of all the issues of magazine published during a time period. In the latter situation, the collection may change over time when new issues of the magazine are added. Readers of such books, magazines, or other documents start by identifying the collection. They then take a picture of an EMM using a portable device with a camera—such as a smartphone, tablet, or personal digital assistant (PDA)—that uploads the picture to an EMM server and redirects the device to the media link associated with the EMM.

The authoring tool presents the pages of the collection as image thumbnails to allow the author to select a page and to place one or more EMMs on it. Especially in cases where the collection does not grow over time, it is beneficial to compare the page shown in the authoring tool to the other pages in the collection and to indicate page regions that can be confused with regions on other pages.

Figure 1A:
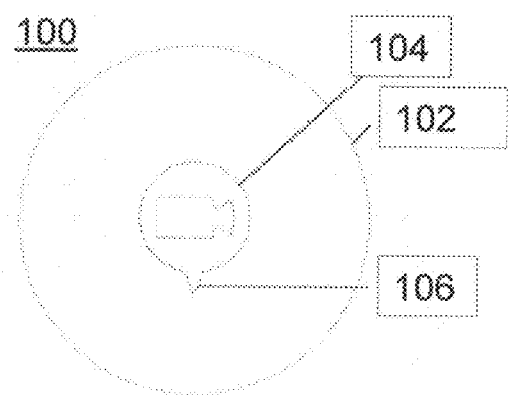
FIGS. 1A and 1B are related art illustrations of embedded media markers (EMMs) and their use on printed media.
Figure 1B:
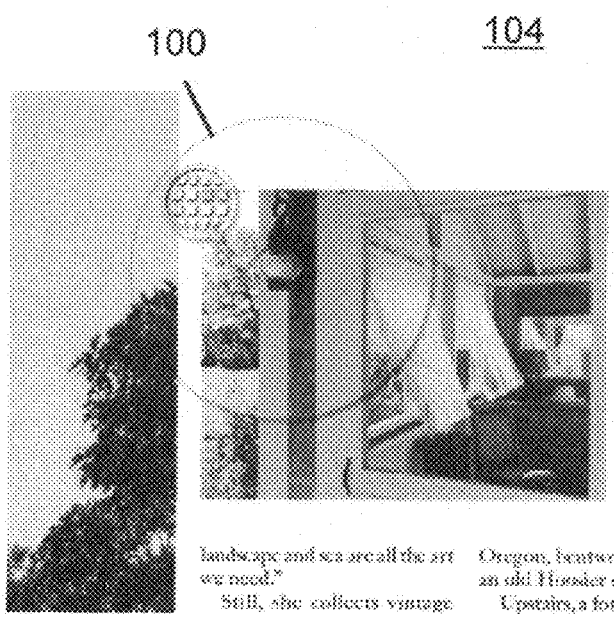
Figure 4:
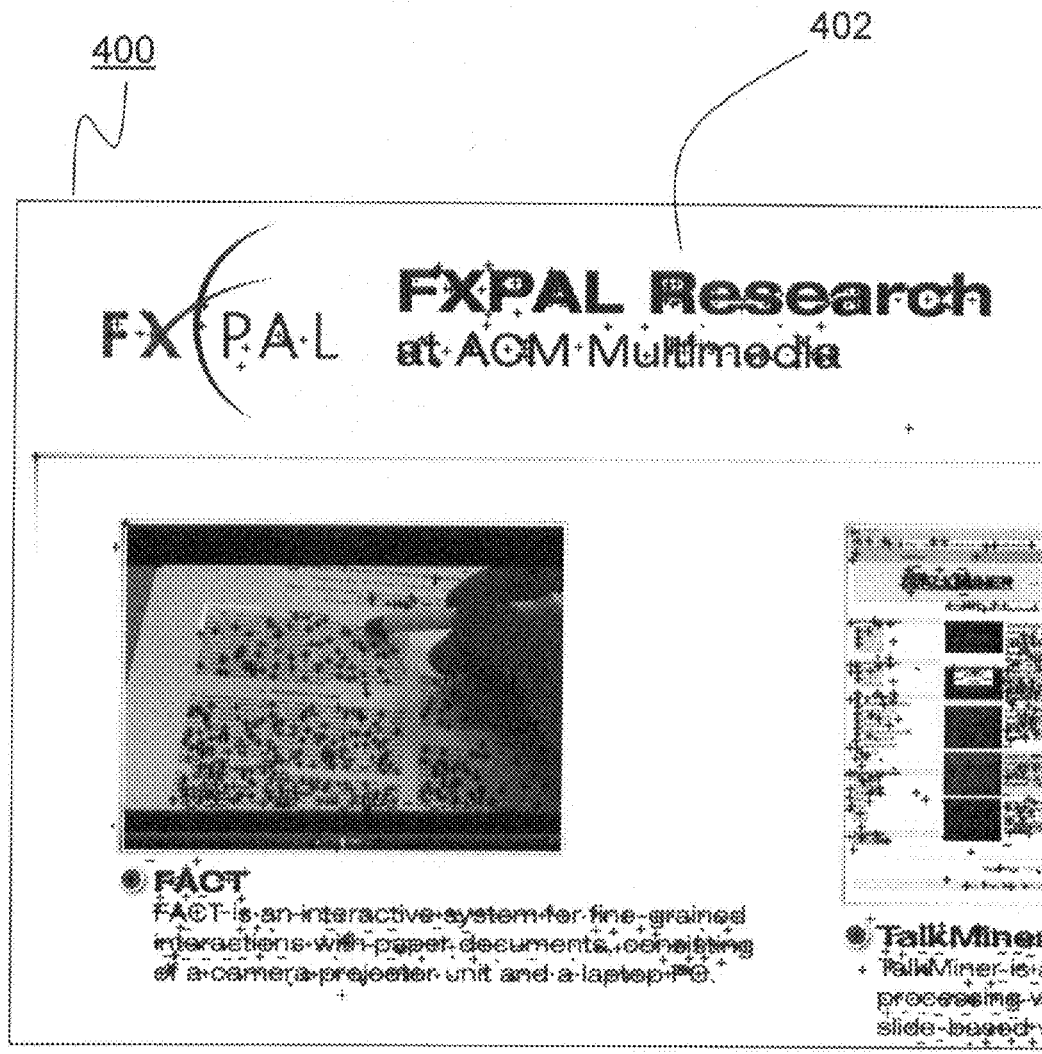
FIG. 4 is an illustration of a graphical user interface (GUI) of an EMM authoring tool depicting keypoints, according to one embodiment of the invention.
Figure 5:
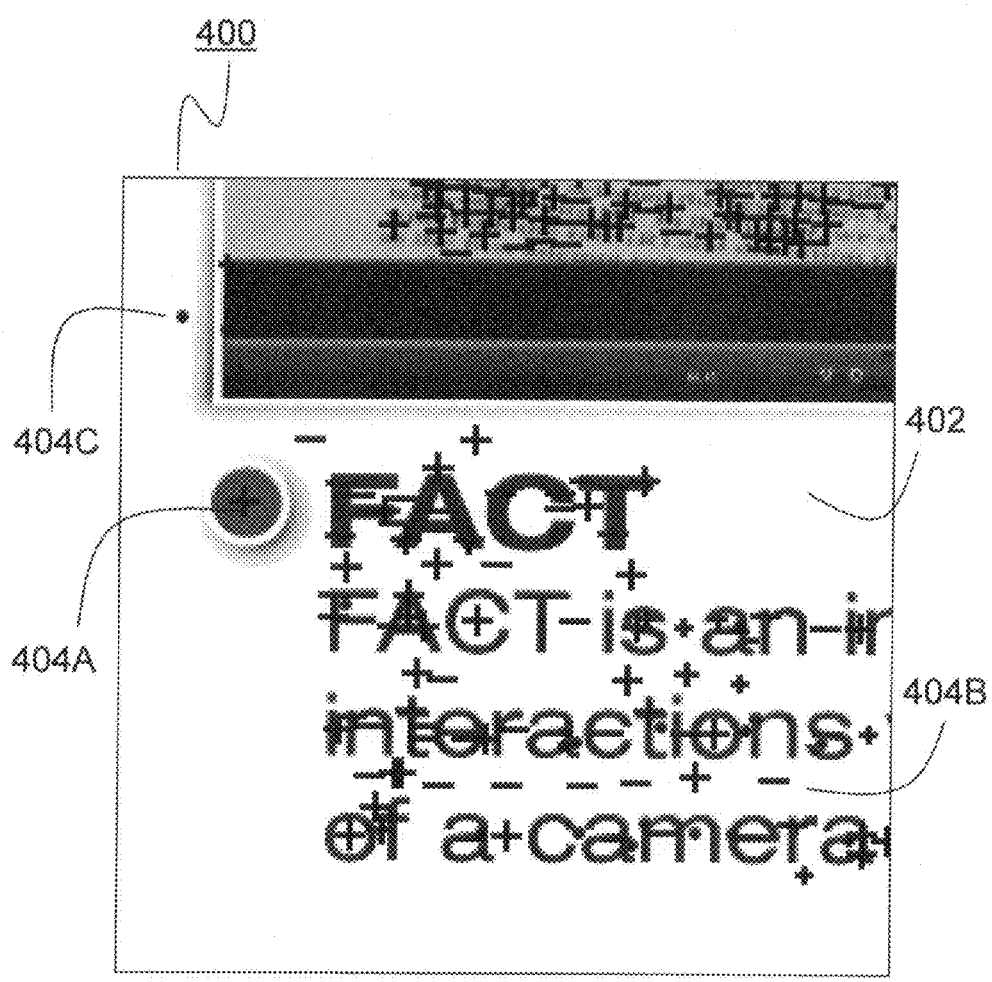
FIG. 5 is a close-up illustration of the GUI illustrating positive and negative keypoints on a physical document, according to one embodiment of the invention.
Figure 6:
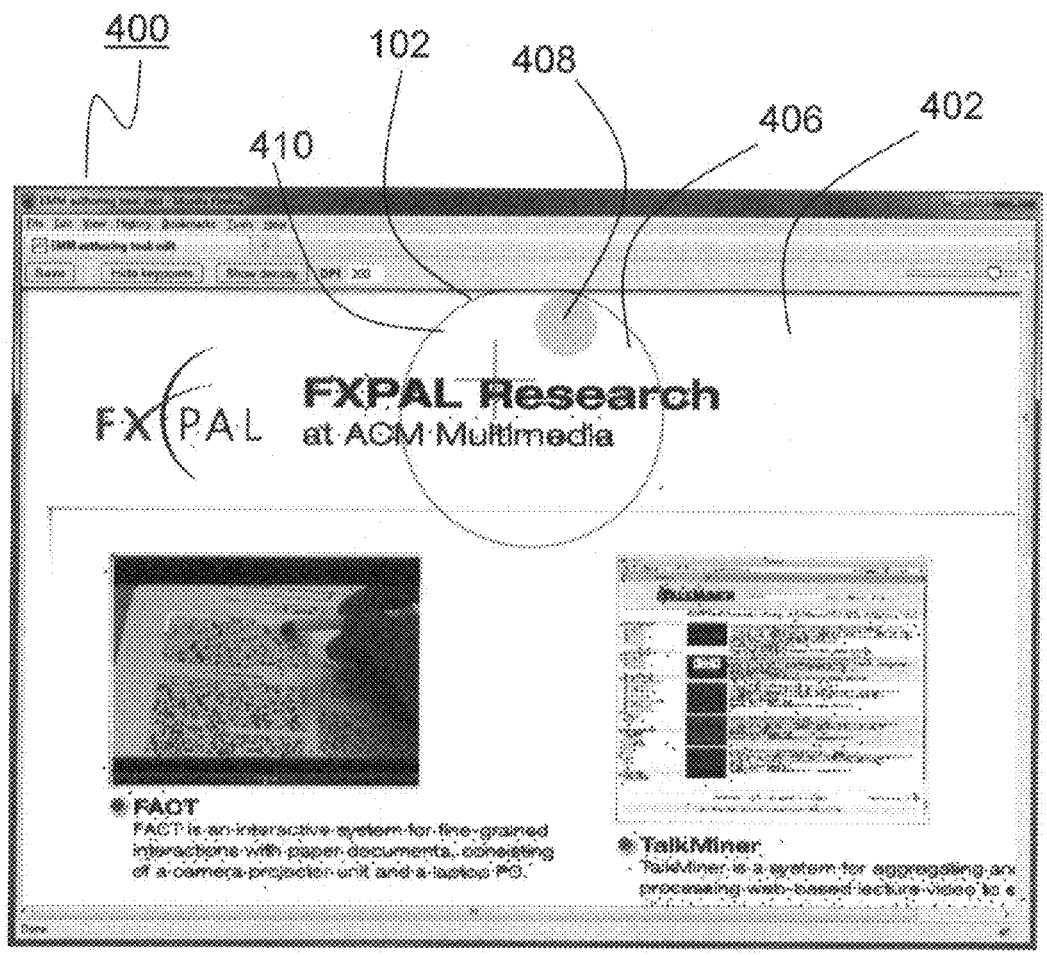
FIG. 6 is an illustration of a candidate EMM in a location selected by a user using the EMM authoring tool, according to one embodiment of the invention.
Figure 7:
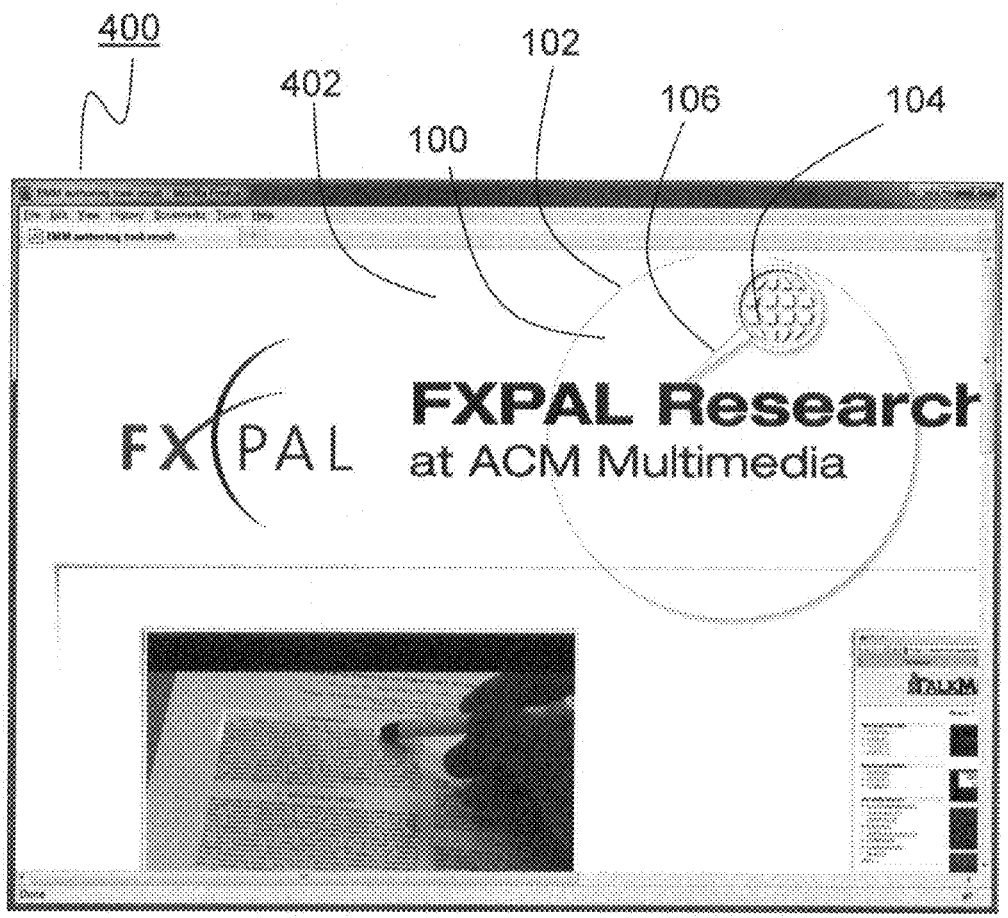
FIG. 7 is an illustration of a final version of the EMM, according to one embodiment of the invention.

FIGS. 4-7 show a graphical user interface (GUI) of the authoring tool and the placement of one EMM on a page. In FIG. 4, a GUI 400 of the authoring tool is shown running in an Internet browser application, such as Internet Explorer (Microsoft Corp., Redmond, Wash.) or Firefox (Mozilla Foundation, Mountain View, Calif.). The GUI 400 displays a document 402 on which the user wishes to add a visual link such as an EMM. In FIG. 5, a close-up view of the GUI 400 is shown where keypoints 404 are visible on different portions of the document. A keypoint is a feature vector describing the local image characteristics near a location in an image. Examples are the 128 dimensional SIFT features and the 40 dimensional FIT features. In this embodiment, the keypoints are represented by different shapes, where a positive keypoint 404A is represented by a plus sign, a negative keypoint 404B is represented by a minus sign and a neutral (near zero value) keypoint 404C is represented by a dot. The relative size of the signs is also indicative of the magnitude of the scores. In one embodiment, the size of the signs may vary between 5 and 11 pixels wide, corresponding to scores greater than 0.3 and less than 1.0. Scores of −0.3 to 0.3 would correspond to varying sizes of dots, and scores less than −0.3 to −1.0 would correspond to varying sizes of minus signs. In another embodiment (not shown), the keypoints may be color-coded into red keypoints, blue keypoints and purple keypoints, where a red keypoint is a negative keypoint, a blue keypoint is a positive keypoint, and a purple keypoint is a value near zero. The significance of the different colors and shapes of keypoints will be described further below. FIG. 6 illustrates a candidate EMM 406 which the user has placed on the document 402 using the GUI 400. The candidate EMM 406 has not been permanently positioned by the user or the system. The candidate EMM 406, in this embodiment, may be displayed as a different color than the final version of the EMM, and it may only have a blank circle 408 for the icon 104 (see FIG. 1A) and a cross 410 which the user can move anywhere within the boundary 102 of the candidate EMM 406 to select a location for placement of the icon 104. FIG. 7 illustrates the document with the EMM 100 which has now been made permanent and affixed to the document 402. The EMM 100 now displays the icon 104 with a specific shape, pattern, letter, etc. corresponding to the type of EMM as well as the pointer 106.

III. Improving Retrieval Performance

When trying to determine a matching EMM after taking a picture of a part of a document page, the system first determines the rotation- and scale-invariant keypoints in the submitted picture. For each keypoint, the closest or approximate closest keypoint in a database of all keypoints of all EMMs is determined. The number of found keypoints is accumulated for each EMM and the EMM with the most matching keypoints is returned, provided that the keypoint count exceeds a threshold.

According to one embodiment, the authoring tool improves the retrieval performance by avoiding page regions that would produce ambiguous matches. Keypoints from candidate page regions are checked against a keypoint database. If there are too many matches, the author is discouraged from using a particular candidate region. In one embodiment, the author may be discouraged from using a particular region by three visual cues: the overlay will turn a dark brown color, the size of the EMM may become larger when moving it to the region, and the circle turns red if there is no possible location to place the EMM in that region. The size and color of the EMM may change instantly and in real-time as the user moves the EMM around the page to find a suitable location. Alternative visual or audio prompts could be given, such as changing a cursor shape when a bad region is located or using an area of the interface to display a message to the user indicating whether a region is suitable for placement or not.

IV. Looking at Other Pages in the Collection

When an author works on a page to place one or more EMMs, all the keypoints on that page are matched against a database of existing keypoints. Those keypoints come either from previously authored EMMs or from other pages in the same collection. Other pages are represented as one or more EMM. To support authoring of EMMs, it is advantageous to segment the page using either a simple grid (e.g., a 3×4 grid for a typical portrait page) or the results from a page segmentation algorithm. When a page is segmented, each segment is treated as an EMM. Because the algorithm is the same in both cases, we refer to the other pages and page segments as EMMs for the rest of this section. Comparing the EMM authoring page against the other pages in the collection has both advantages and disadvantages. An advantage is that regions that are ambiguous such as text passages in the default font can be avoided. The same characters or words appear on many different pages so that it is possible that another EMM with those characters or words would provide a better match to a low-quality picture of an EMM containing such an ambiguous page region. Such regions can be found without requiring the authoring of previous EMMs. On the other hand, such an approach (if used to block the authoring of EMMs) may prevent attaching an EMM to a distinctive region that is repeated on two or more pages.

For authoring EMMs, when a user indicates the desire to author an EMM for a region that is repeated some limited number of times, the system can ask if the EMM should be added for all instances of this region. This would make it possible to map all instances of a corporate logo to the same destination and make it clear to the author that visually similar EMMs must link to the same location.

V. Determining Possible Conflicts During Authoring

To determine which keypoints on the EMM authoring page conflict with other pages or EMMs, each keypoint is assigned a score between −1 and 1. Keypoints that do not have a match to a keypoint in the database within the distance threshold receive a score of 1, indicating that there is no conflict. Other keypoints are assigned a score s based on the distance d and the maximum match distance $d_{max}$. The normalized distance between 0 and 1 is linearly mapped to a score between −1 and 1.

$$s = 2 * d/d_{max} - 1 \qquad (1)$$

When evaluating a region on the authoring page, the scores of keypoints in that region are added. A large positive sum indicates that the region is suitable for placing an EMM. A neutral or, even worse, a negative sum indicates that the region is unsuitable. A threshold may be used to determine if a page region contains enough keypoints. For example, the page region could be required to contain at least 100 keypoints. By using the sum of keypoint scores instead of the keypoint count, the notion of conflicts can be incorporated with other pages or EMMs. For example, either 100 keypoints with a score of 1 or 200 keypoints with an average score of 0.5 would be sufficient for a page region. To improve performance for finding suitable page regions, only rectangular regions parallel to the page bounds are used. However, this approach can also be applied to non-rectangular regions, for example, by first looking at the rectangular bounding box of the region and then checking the actual shape in a second step.

To further speed up the computation of sums of keypoint scores, the use of an integral map is adapted that pre-computes the cumulative score for each point on the page from the page origin, as disclosed in U.S. Ser. No. 12/646,841 (referenced above). For determining the sum of keypoint scores in a rectangular region parallel to the page bounds, only four entries in the integral map have to be looked up and added or subtracted.

VI. Emphasizing Conflicts with the Same EMM

Because keypoints that match the same EMM would bias the retrieval towards that EMM at the expense of the newly authored EMM, the scores for those keypoints are lowered. This difference between the perfect score of 1 and the actual score of a keypoint is called the penalty score. As the keypoint score lies between −1 and 1, that penalty score ranges from 0 to 2. The system spreads this penalty to nearby keypoints that match the same EMM. The penalty score is weighted by a distance function and the weighted sum of matching penalty scores is accumulated at each keypoint. This weighted sum of penalty scores is subtracted from the original score of the keypoint.

Figure 8:
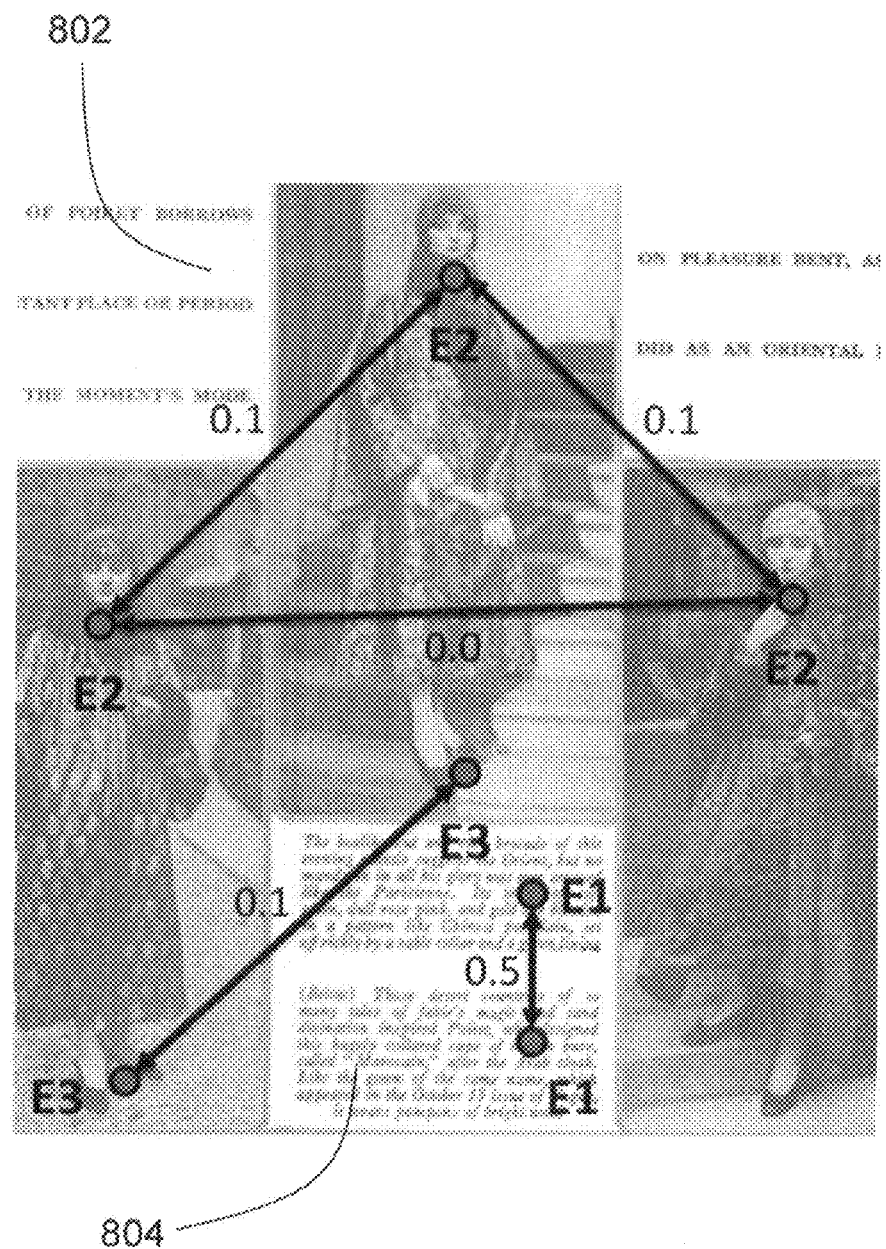
FIG. 8 is an illustration of penalty scores among a plurality of keypoints on the physical document, according to one embodiment of the invention.

FIG. 8 illustrates on example of penalty score distribution among nearby keypoints matching the same EMM. On a page 802 illustrates herein, there are keypoints that match three existing EMMs (E1, E2 and E3). The two keypoints that are associated with the text region 804 at the bottom of the page (matching E1) are close together and are assumed to share half of their penalty scores with each other. Thus, if the points initially had scores of 0.0 and −0.5, they would end up with scores of −0.75 (=0-0.5*(1--0.5)) and −1.0 (=−0.5-0.5*(1-0)), respectively.

The two keypoints matching E3 are further apart and hypothetically share 10% of their penalty score with each other. Thus, if they had the same initial scores as the E1 pair (0.0 and −0.5), their final scores are −0.15 (=0-0.1*(1--0.5)) and −0.6 (=−0.5-0.1*(1-0) respectively. The top three keypoints (matching E2) provide an example where the middle point would be reduced by both of the other points while the far left and far right point are beyond the threshold for penalty sharing.

By penalizing nearby keypoints matching the same EMM further, page regions containing these keypoints are made even less suitable. Because those regions would easily be confused with the matching EMM, this is a desired outcome.

In one embodiment, the spread penalty score is weighted by a normalized distance within a given radius. A radius of 0.25 inches may be used, but other radii may produce better results with different source materials. Rather than reducing the spread penalty score linearly with distance, other mathematical functions such as the square distance, a Gaussian function, or a constant factor with a distance cutoff are also possible. The spread penalty score is accumulated separately and added to each keypoint score in a separate step to avoid spreading beyond the distance threshold or spreading back and forth. The combined score can be truncated at −1 to avoid large negative values. However, the visualization described in the next section works better without this truncation in dense areas of keypoints matching the same EMM. As shown in FIGS. 4 and 5, negative keypoint scores of −1 and lower are visualized as minus signs 404B, positive keypoint scores of 1 as plus signs 404A, and scores in between as dots 404C. Depending on the source material, other shapes or colors can be used to be noticeable on the displayed page.

When determining which keypoints match EMMs in the database, it may be opportune to look at the k closest matches rather than just looking at the closest match. Such an approach deals with situations where many keypoints in a region match the same EMM but some of those keypoints have slightly closer matches for different EMMs. This approach prevents that a keypoint of a conflicting EMM is shadowed by a keypoint from another EMM. Such a region would still be unsuitable for placing a new EMM. Thus, the penalty score should reflect this unsuitability. Rather than just spreading one penalty score, penalty scores for different matching EMMs can be spread in parallel. For each keypoint, the penalty score for each match may be separately computed. Those penalty scores are then spread separately such that each keypoint in parallel accumulates weighted penalty scores for each EMM in the database that it matches. The maximum of the weighted sums of penalty scores is subtracted from the original score.

As an alternative, one can use a different score for each match based on weights. The weight $w_i$ for a match is based on the distance of that match, $d_i$, and the distance of the next closest match, $d_{i+1}$.

$$w_i = d_{i+1}/d_i \quad (2)$$

Given this weight, the score for the match would be expressed as:

$$s_i = 2*(1-w_i) - 1 \quad (3)$$

A disadvantage of this variant is that worse matches can be assigned higher weights. For example, if the two best matches have similar distances and the third-best match is much worse, the second-best match would be assigned a higher weight than the best match.

VII. Using Nearby Matches During Retrieval

When taking multiple matches into consideration during retrieval, the plain voting scheme of counting the number of keypoint matches for each candidate EMM is replaced by sums of keypoint match scores for each candidate EMM. A keypoint match score is 1 at a distance of 0 and 0 at the maximum match distance. A variant of the penalty score described in the previous section can be used to boost the score for candidate EMMs where several keypoints within a radius match the same EMM. The penalty score is highest when the distance to a matching keypoint is smallest. The same is desirable for a bonus score. The keypoint match score can serve as the bonus score without modification. Just like the penalty score, the bonus score is spread within a radius to keypoints matching the same EMM. Scores are accumulated in parallel for different candidate EMMs. Unlike the penalty score where only the maximum accumulated score is used, all accumulated bonus scores are taken into consideration when determining which candidate EMM has the highest score total.

VIII. Visualizing Page Regions Suitable for Authoring EMMs

Figure 9:
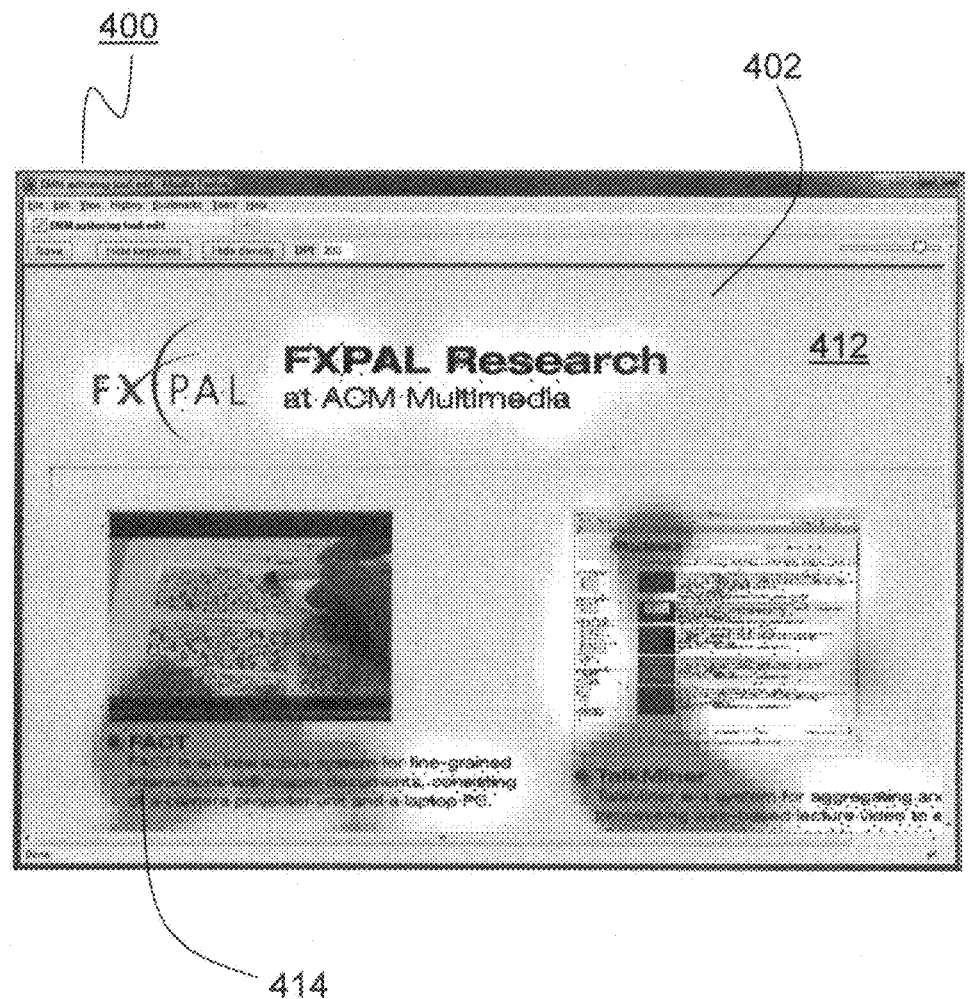
FIG. 9 is an illustration of a visualization of regions of the physical document shaded to indicate their suitability for placement of a new EMM, according to one embodiment of the invention.
Figure 10:
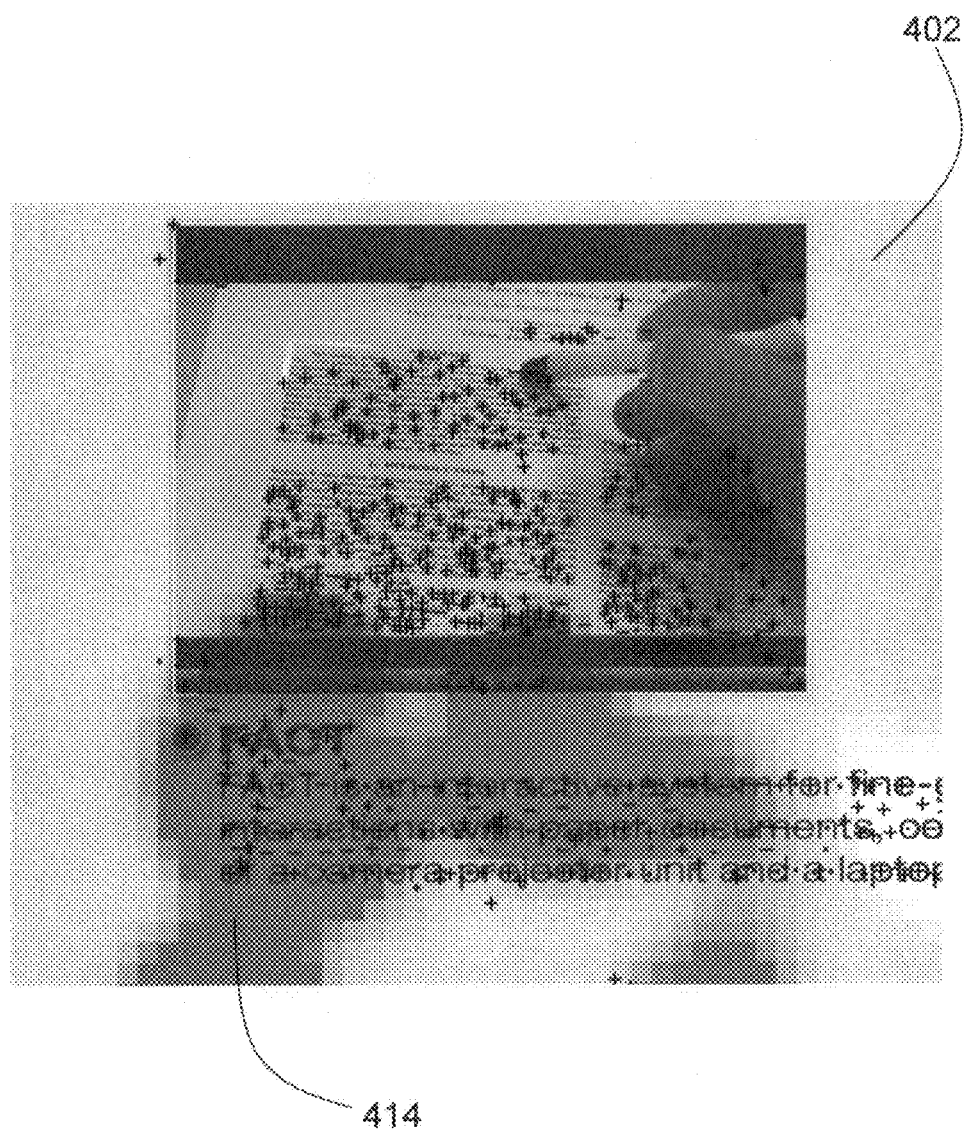
FIG. 10 is a close-up illustration of the visualization of regions of the physical document, according to one embodiment of the invention.

As illustrated in FIG. 9, the authoring tool provides a visualization of the suitability of regions of the document by displaying the document page with a visual overlay 412 that provides a gradient of shading 414 over regions of the document 402 with low keypoint scores. FIG. 10 is a close-up view of the shading 414, where the darker shading depicts regions of the document 402 which are less suitable for placing an EMM than regions with light or no shading.

Figure 11:
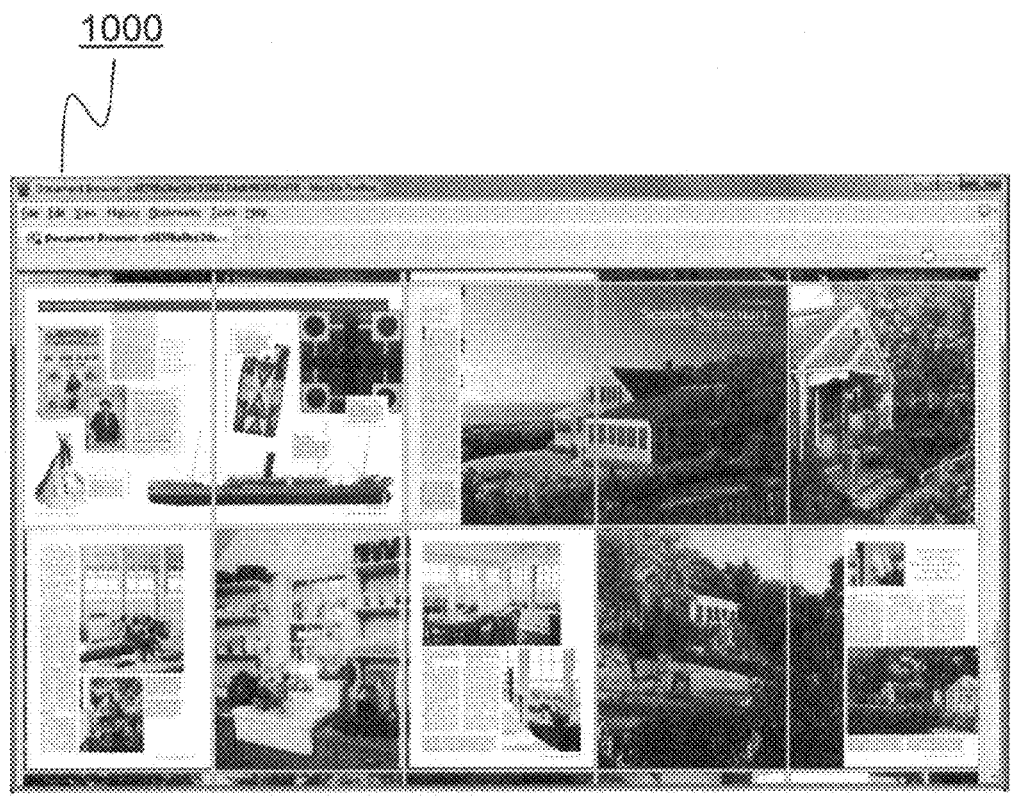
FIG. 11 is another illustration of a graphical user interface (GUI) of an EMM authoring tool displaying multiple document pages in a browser interface, according to one embodiment of the invention.

FIG. 11 is another embodiment of a GUI 1000 of the authoring tool which displays multiple pages of a document on a single display. This GUI 1000 may provide more information to the user about similarities between other keypoints and EMMs within the same document.

Figure 12:
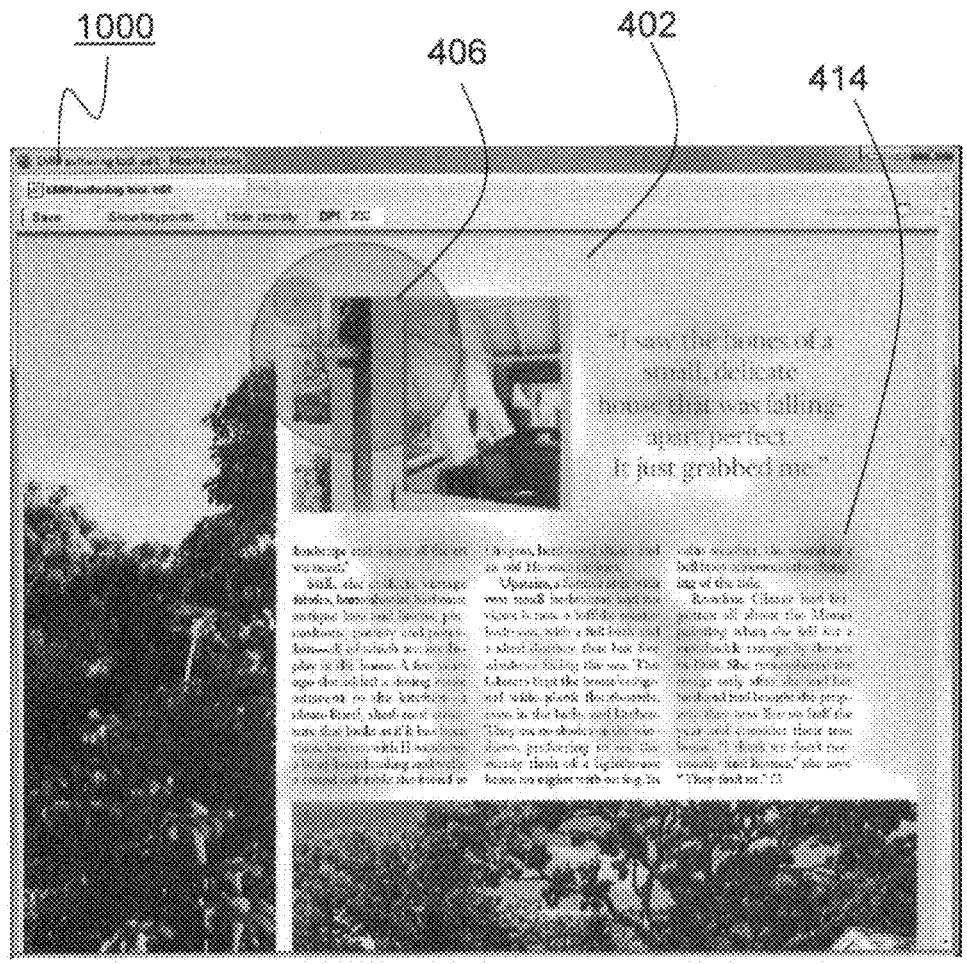
FIG. 12 is another illustration of a visualization of areas of the physical document shaded to indicate their suitability for placement of the candidate EMM, according to one embodiment of the invention.

FIG. 12 illustrates the placement of a candidate EMM 406 on a shaded page of the document 402 where the user can identify unsuitable areas for placement of the EMM based on the areas with dark shading 414. The user then interactively positions the EMM, and the EMM region automatically grows or shrinks depending on the sum of the scores in the region. The EMM is colored green if the score exceeds a threshold, meaning that the regions signified by the EMM can be differentiated from other documents.

Regions suitable for EMMs contain many keypoints not similar to those used by other EMMs and few keypoints that are already used. When just looking at the presence of keypoints, the average keypoint density in a region indicates its suitability. An application-specific threshold for this density can be used to visualize if the density is above the threshold or how close it gets. In one embodiment, a threshold of 100 keypoints in a 2-inch by 2-inch region may be used.

To determine the average keypoint density while taking keypoint scores into consideration, the score of each keypoint is spread over a region. The score is spread over a circular region with a weight that linearly decreased with distance. A radius of 0.5 inches is used for the circular region, but other radii may produce better results with different source material. Other functions can be used as well, such as a two-dimensional Gaussian function or a square region where the weight either decreases with distance or stays constant. In all cases, the integral under the two-dimensional curve should be normalized to one.

This approach can be used with the negative keypoint scores described earlier. When combining positive and negative scores, both an empty region and a region with an equal amount of positive and negative scores would have a neutral suitability. When all keypoints have a score of 1, any region where the keypoint density exceeds the threshold has the maximum suitability. A higher density of keypoints with positive scores less than one would also lead to the maximum suitability. Conversely, a high density of keypoints with negative scores produces a region with a negative suitability.

When spreading the earlier discussed penalty score that penalizes keypoints in the same vicinity matching the same EMM, keypoint scores can drop below −1. When combined with the keypoint score density, this produces desirable results because those scores push a larger region to the minimum suitability, indicating to the user that this region should really be avoided. FIGS. 5 and 6 illustrate this visualization technique using shades of brown and different amounts of transparency. Other visualization techniques such as color gradients from red to green or patterns instead of transparency can be used instead.

Figure 13:
FIG. 13 is an illustration of a visualization of keypoint conflicts and unsuitable page regions on the physical document, according to one embodiment of the invention.
Figure 14:
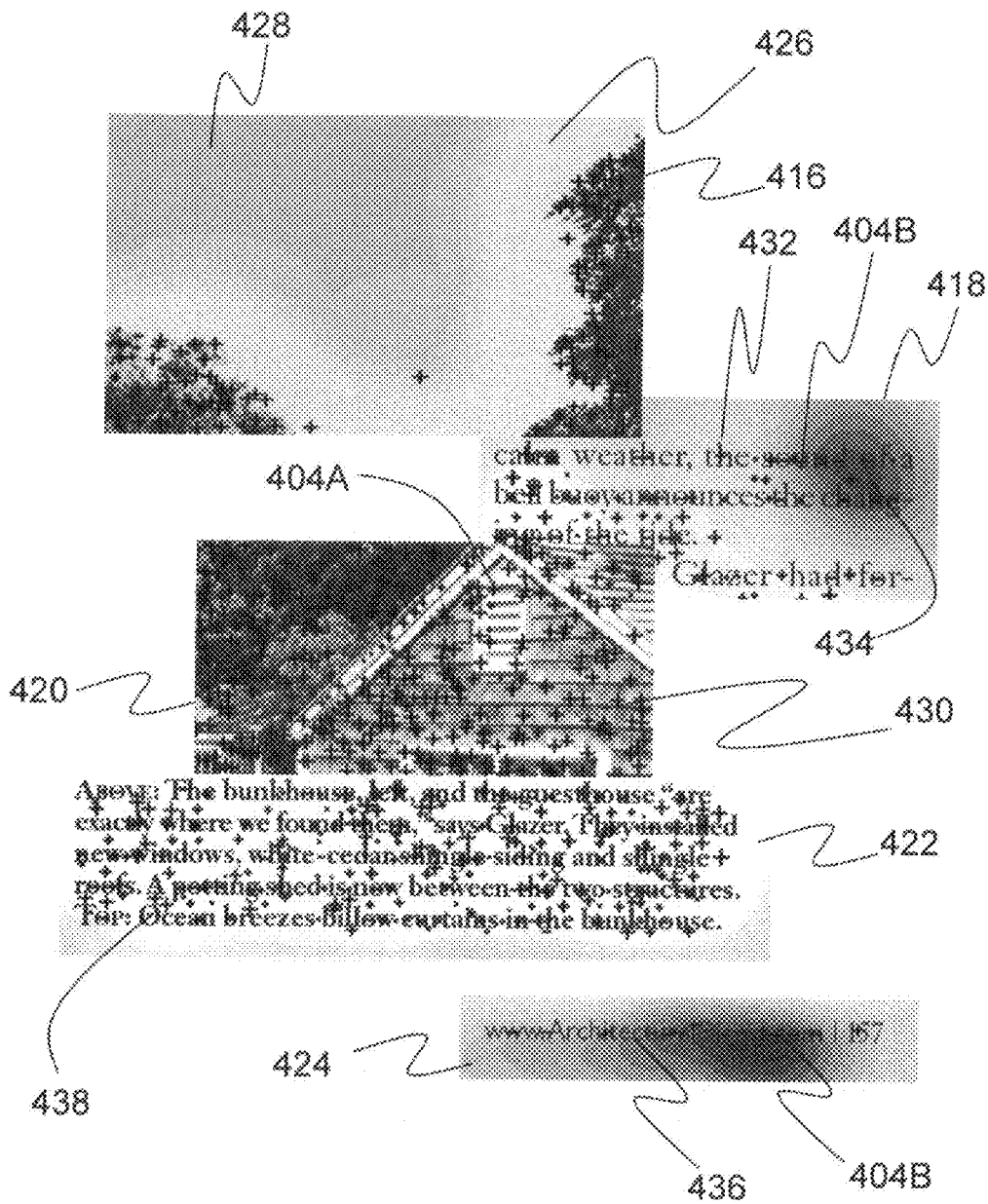
FIG. 14 is a close-up illustration of the keypoint conflicts and unsuitable page regions on the physical document illustrated in FIG. 12, according to one embodiment of the invention.

FIG. 13 illustrates this visualization technique using shading 414 and different amounts of transparency. Other visualization techniques such as color gradients from red to green or patterns instead of transparency can be used instead. The close-up illustrations of different regions 416, 418, 420, 422 and 424 of the document 402, as shown in FIG. 14, demonstrate that empty areas such as the sky 426 in region 416 are covered by a semi-translucent overlay 428. In contrast, the picture of the house 430 in region 420 contains a high density of positive keypoints 404A represented by plus signs representing keypoints that match nothing else, so that no overlay is added. The body text 432 at the top of the page in region 418 has regions with predominantly negative keypoints 404B represented by minus signs, or dashes, that are covered with a solid overlay 434. This is even more the case for the page footer 436 in region 424 that only contains dashes (negative keypoints 404B). The figure caption 438 with bold text in region 422 does not match much else and has no visible overlay, so that it would be suitable for placing an EMM.

IX. Automatic Adjustment of EMM Location and Size

Using the sums of keypoint scores described above, the authoring tool automatically adjusts the size of the EMM as the user places it on the page or drags it to a different location. The authoring tool determines the smallest rectangular shape at the same aspect ratio and centered on the location specified by the author that has a sufficiently large total score. If the resulting regions would be very large, the authoring tool attempts to move the EMM to avoid unsuitable regions. Both assistive techniques can be turned off by the author. If no suitable region can be found, the EMM is colored red to indicate its unsuitability.

X. Computer Embodiment

Figure 15:
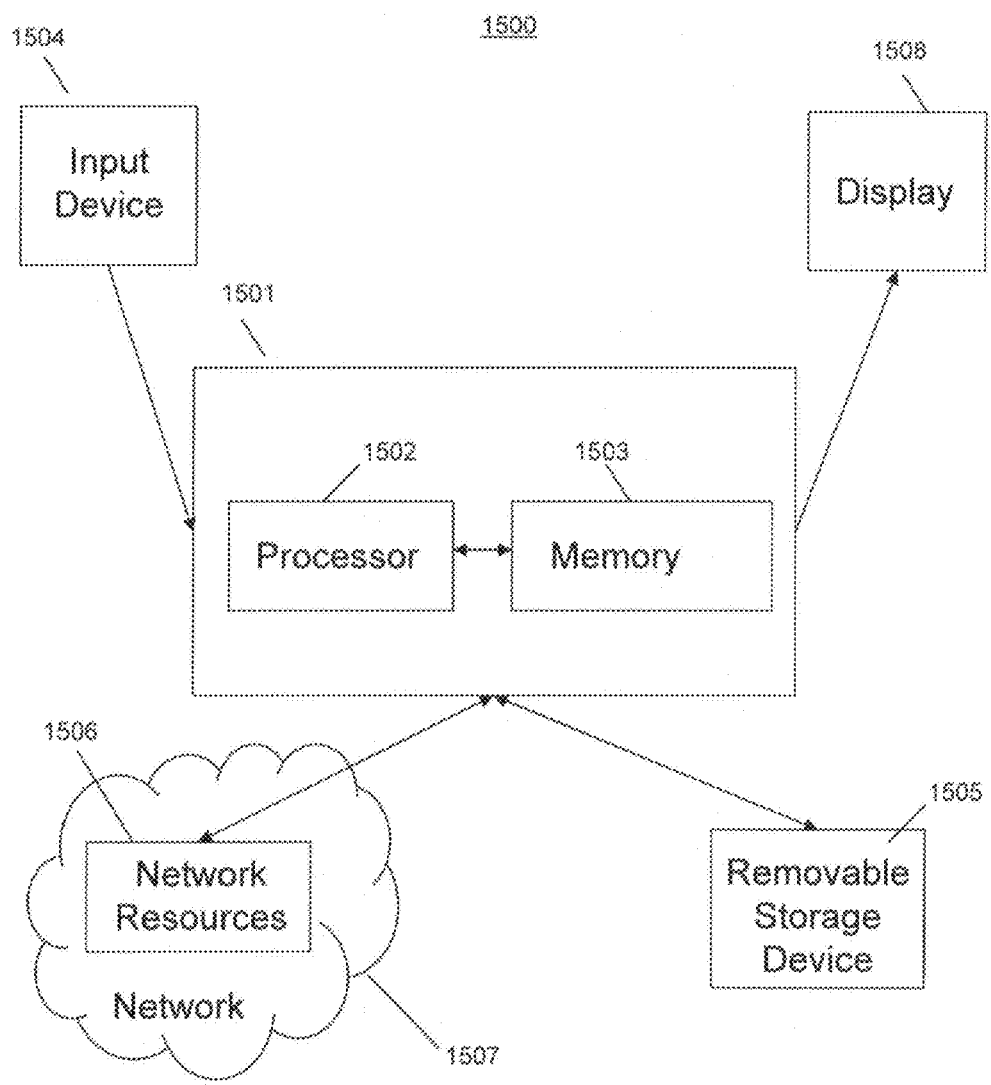
FIG. 15 is a block diagram of a computer system upon which the system may be implemented.

FIG. 15 is a block diagram that illustrates an embodiment of a computer/server system 1500 upon which an embodiment of the inventive methodology may be implemented. The system 1500 includes a computer/server platform 1501 including a processor 1502 and memory 1503 which operate to execute instructions, as known to one of skill in the art. The term "computer-readable storage medium" as used herein refers to any tangible medium, such as a disk or semiconductor memory, that participates in providing instructions to processor 1502 for execution. Additionally, the computer platform 1501 receives input from a plurality of input devices 1504, such as a keyboard, mouse, touch device or verbal command. The computer platform 1501 may additionally be connected to a removable storage device 1505, such as a portable hard drive, optical media (CD or DVD), disk media or any other tangible medium from which a computer can read executable code. The computer platform may further be connected to network resources 1506 which connect to the Internet or other components of a local public or private network. The network resources 1506 may provide instructions and data to the computer platform from a remote location on a network 1507. The connections to the network resources 1506 may be via wireless protocols, such as the 802.11 standards, Bluetooth® or cellular protocols, or via physical transmission media, such as cables or fiber optics. The network resources may include storage devices for storing data and executable instructions at a location separate from the computer platform 1501. The computer interacts with a display 1508 to output data and other information to a user, as well as to request additional instructions and input from the user. The display 1508 may therefore further act as an input device 1504 for interacting with a user.

The embodiments and implementations described above are presented in sufficient detail to enable those skilled in the art to practice the invention, and it is to be understood that other implementations may be utilized and that structural changes and/or substitutions of various elements may be made without departing from the scope and spirit of present invention. The following detailed description is, therefore, not to be construed in a limited sense. Additionally, the various embodiments of the invention as described may be implemented in the form of software running on a general purpose computer, in the form of a specialized hardware, or combination of software and hardware.

What is claimed is:

1. A method for placing a new visual link to digital media on a document, comprising:
    displaying at least one page of a document on a display;
    identifying first keypoints which are located in a candidate region and comparing the first keypoints of the candidate region with second keypoints, the second keypoints corresponding to existing visual links, using a computer with a processor and a memory;
    scoring each of the first keypoints based on similarities between the first keypoints and the second keypoints based on the comparing, to determine an overall score for the candidate region;
    indicating the overall score of the candidate region to the user;
    receiving a user input indicating whether or not the user selects the candidate region; and
    placing the new visual link on the document according to the received user input.

2. The method of claim 1, further comprising modifying the score of each of the first keypoints based on scores of surrounding first keypoints.

3. The method of claim 1, further comprising generating a visual overlay on the document based on the first keypoint scores, wherein the visual overlay provides a visual indication of the suitability of one or more candidate regions of the document for placement of the new visual link.

4. The method of claim 3, wherein the visual overlay displays gradients of shading to indicate whether one or more candidate regions are suitable for placement of the new visual link.

5. The method of claim 1, further comprising adjusting a size and location of the new visual link based on the first keypoint scores.

6. The method of claim 2, further comprising penalizing first keypoints adjacent to a first keypoint which all match an existing visual link.

7. The method of claim 2, wherein the modifying of the score of each first keypoint is further modified by a weighted scale corresponding to a distance between the first keypoints.

8. The method of claim 1, further comprising determining the suitability of a candidate region of the document for placement of the new visual link based on a keypoint score density.

9. The method of claim 1, further comprising increasing the suitability of a candidate region of the document where a plurality of first keypoints within a set radius match an existing visual link.

10. The method of claim 1, wherein the new visual link and the existing visual links are embedded media markers (EMMs).

11. A system for placing a new visual link to digital media on a document, comprising:
    a display unit which displays at least one page of a document;
    an input unit to receive user input;
    a matching unit comprising a processor which identifies first keypoints which are located in a candidate region and compares the first keypoints of the candidate region with second keypoints, the second keypoints corresponding to existing visual links;
    a scoring unit which scores each of the first keypoints based on similarities between the first keypoints and the second keypoints based on the comparing, to determine an overall score for the candidate region; and
    an indicator which indicates the overall score of the candidate region to the user, wherein the input unit receives a user input indicating whether or not the user selects the candidate region; and the system further comprises:

a placement unit which places the new visual link on the document according to the received user input.

12. The system of claim 11, further comprising a score modifying unit which modifies the score of each first keypoint based on scores of surrounding first keypoints.

13. The system of claim 12, further comprising penalizing first keypoints adjacent to a first keypoint which all match an existing visual link.

14. The system of claim 12, wherein the modification of the score of each first keypoint is further modified by a weighted scale corresponding to a distance between the first keypoints.

15. The system of claim 11, further comprising a visualization unit which generates a visual overlay on the document based on the first keypoint scores, wherein the visual overlay provides a visual indication of the suitability of one or more candidate regions of the document for placement of the new visual link.

16. The system of claim 15, wherein the visual overlay displays gradients of shading to indicate whether one or more candidate regions are suitable for placement of the new visual link.

17. The system of claim 11, further comprising adjusting a size and location of the new visual link based on the first keypoint scores.

18. The system of claim 11, further comprising determining the suitability of a candidate region of the document for placement of the new visual link based on a keypoint score density.

19. The system of claim 11, further comprising increasing the suitability of a candidate region of a document where a plurality of first keypoints within a set radius match an existing visual link.

20. The system of claim 11, wherein the new visual link and the existing visual links are embedded media markers (EMMs).

21. A non-transitory computer program product for placing a new visual link to digital media on a document, the computer program product embodied on a computer-readable medium and when executed by a computer, performs the method comprising:

displaying at least one page of a document on a display;

identifying first keypoints which are located in a candidate region and comparing the first keypoints of the candidate region with second keypoints corresponding to existing visual links, using a computer with a processor and a memory;

scoring each of the first keypoints based on similarities between the first keypoints and the second keypoints based on the comparing;

modifying the score of each first keypoint based on scores of surrounding first keypoints;

generating a visual overlay on the document based on the modified first keypoint scores, wherein the visual overlay provides a visual indication of the suitability of one or more candidate regions of the document for placement of the new visual link;

receiving a user input indicating whether or not the user selects the candidate region; and placing the new visual link on the document according to the received user input.

* * * * *